(12) United States Patent
Daines et al.

(10) Patent No.: US 11,227,288 B1
(45) Date of Patent: Jan. 18, 2022

(54) SYSTEMS AND METHODS FOR INTEGRATION OF DISPARATE DATA FEEDS FOR UNIFIED DATA MONITORING

(71) Applicants: Sterling Daines, Thalwil (CH); Benjamin Voigt, Zürich (CH); Claudio Grazioli, Egg (CH); Vasileios Agrafiotis, Ecublens (CH); Antoine Bodin, Lausanne (CH); Darius Sidlauskas, Sulpice (CH); Michal Paszkowski, Rombach (CH); Samuel Burkart, Zürich (CH); Sergey Golubev, Lausanne (CH); Ajay Kumar, Zürich (CH); Alexander Madsen, Lucerne (CH); Andrew McPherson, Wädenswil (CH)

(72) Inventors: Sterling Daines, Thalwil (CH); Benjamin Voigt, Zürich (CH); Claudio Grazioli, Egg (CH); Vasileios Agrafiotis, Ecublens (CH); Antoine Bodin, Lausanne (CH); Darius Sidlauskas, Sulpice (CH); Michal Paszkowski, Rombach (CH); Samuel Burkart, Zürich (CH); Sergey Golubev, Lausanne (CH); Ajay Kumar, Zürich (CH); Alexander Madsen, Lucerne (CH); Andrew McPherson, Wädenswil (CH)

(73) Assignee: CREDIT SUISSE AG, Zurich (CH)

( * ) Notice: Subject to any disclaimer, the term of this patent is extended or adjusted under 35 U.S.C. 154(b) by 76 days.

(21) Appl. No.: 16/403,424

(22) Filed: May 3, 2019

Related U.S. Application Data

(60) Provisional application No. 62/693,151, filed on Jul. 2, 2018.

(51) Int. Cl.
*G06Q 20/40* (2012.01)
*G08B 21/18* (2006.01)
*G06F 16/25* (2019.01)

(52) U.S. Cl.
CPC ....... *G06Q 20/4016* (2013.01); *G06F 16/254* (2019.01); *G08B 21/182* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 2005/0222931 A1* | 10/2005 | Mamou | ................ | G06F 16/254 705/35 |
| 2014/0006244 A1* | 1/2014 | Crowley | ................ | G06Q 40/04 705/37 |
| 2018/0374580 A1* | 12/2018 | Gupta | ................... | G16H 50/30 |

OTHER PUBLICATIONS

Dialog NPL (Non-Patent Literature) Search Report Listing Only, dated Oct. 15, 2021. (Year: 2021).*

* cited by examiner

*Primary Examiner* — Hai Tran
(74) *Attorney, Agent, or Firm* — Norton Rose Fulbright US LLP

(57) ABSTRACT

The present disclosure relates to methods and systems for integrating disparate data feeds and providing unified data monitoring to identify entities and/or transactions associated with the data for further investigation. Embodiments provide a system including at least one data feed with data having a first structure, and a common data layer configured to map the data to a common data model specifying a second structure common within the system. The system also includes a factor component configured to define a plurality of Factors and their inter-dependencies for deriving information from the mapped data, a model repository to run a selected set of Factors against a selected set of mapped data, (Continued)

according to a specified Model to identify data in the mapped data to evaluate, and to generate an alert based on Model parameters applied to the identified data, and an alert component to format the alert for external consumption.

18 Claims, 6 Drawing Sheets

| Factor ID | Name | Definition | Component | Risk Mapping |
|---|---|---|---|---|
| 512 Factor Filters | 514 Factor Description | 516 Distribution | 518 Null Behavior | 520 Values Indicating Risk Activity |

FIG. 5

SYSTEMS AND METHODS FOR INTEGRATION OF DISPARATE DATA FEEDS FOR UNIFIED DATA MONITORING

CROSS REFERENCE TO RELATED APPLICATION

The present application claims priority from U.S. Provisional Application No. 62/693,151, filed Jul. 2, 2018 and entitled, "SYSTEMS AND METHODS FOR INTEGRATION OF DISPARATE DATA FEEDS FOR UNIFIED DATA MONITORING," the disclosure of which is incorporated by reference herein in its entirety.

TECHNICAL FIELD

The present application relates to integration of disparate data feeds for a unified monitoring system.

BACKGROUND

Data is collected from almost every facet and aspect of life, and from almost every transaction conducted. As a result, large amounts of transaction data are being generated, collected, and stored. Sorting through the enormous amounts of transaction data in order to find particular information and/or patterns can present a daunting challenge. For example, when monitoring transaction data for suspicious activity, the amount of data makes it difficult to sort through. In addition, because the transaction data is collected from various disparate sources and systems, the format of the different transactions in the transaction data can also vary, making it even more difficult to process the transaction data for suspicious activity. Some existing systems attempt to address these issues.

For example, in one particular solution, transaction data is monitored for suspicious activity by matching particular transactions in the data to known suspicious patterns, based on rules and/or thresholds. A match would indicate that the particular transaction is potentially suspicious. In these systems, the match is performed through the application of rules and thresholds to the transaction data. This approach, however, is limited because these existing systems may not be able to identify a substantial number of suspicious transactions that, while corresponding to suspicious activity, may not meet a rule or exceed a threshold.

Additionally, these existing systems may not have a robust mechanism to handle situations where the transaction data is provided from disparate sources and systems having different formats. In these cases, the existing systems may have to apply unique rules for every different source, and for every different format, making the process cumbersome and slow. As such, these existing systems are not robust or flexible.

SUMMARY

The present application relates to systems and methods for integrating disparate data feeds and for providing unified data monitoring to identify entities and/or transactions associated with the data for further investigation. In embodiments, data from disparate sources may be integrated into a standardized format. Factors may be applied to the integrated data to derive information from datasets of the integrated data. The derived information may be associated with a particular entity, and may provide an insight into the inherent risk the entity poses with respect to different Factors. In aspects, different Factors may be associated with different aspects of the risk analysis and may include deviance of the entity's transactional activity against peers, the entity's own history, results of previous investigations into the entity, and/or the outcome of pattern analysis of entity behavior.

As used herein, a "Factor" may refer to a rule, a function, a set of functions, a set of instructions, or a combination thereof, executed on a data platform, and configured to derive information from datasets of the data platform. In some aspects, Factors derive information from the integrated data by transforming dataframes, e.g., a dataframe from the integrated standardized dataset, into a new dataframe of data relevant to the Factor. Additionally, Factors may process the relevant data to provide risk mapping indicating a risk level of the Factor with respect to the relevant data.

In embodiments, Factors may be used to build Models. Models may be used to identify entities that are of interest, or in a particular example, entities that may warrant further investigation in the context of transaction monitoring. In aspects, identifying entities of interest may include calculating risk scores. The risk scores may be associated with particular Factor categories. In aspects, particular Factors may be included in a Model, and the Factors to be included may be determined based on the relevance of the Factors to the Model. A Model may be configured to include Factors that provide a contribution to the Model. For example, a Model may be configured based on input from subject matter experts (SMEs) and statistical analysis of the Factors. In these cases, the SMEs and statistical analysis may be used to identify Factors that contribute to the Model.

In embodiments, each of the Factors included in the Model may be weighted. The weighting may be determined by the Factor itself, or may be determined by the Model based on the predetermined configuration. For example, the different Factors in the Model may be weighted based on an associated characteristic of the entity, such as the type of entity (e.g., individual, organization, etc.), the relevant industry segment (e.g., retail, corporations, non-profits, etc.), etc. In aspects, Factors may be weighted based on the relevance of the Factors to the particular characteristic of the entity. Models may be configured to use a table containing the relevant raw and processed data derived from the application of the Factors for use in automated transaction monitoring or direct investigator evaluation.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 5 is a block diagram that illustrates an example representation of a configuration of a Factor in accordance with an embodiment of the present application.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

To address the deficiencies and limitations of existing systems, various aspects of the present disclosure are directed to systems and techniques that provide improved computerized systems. One of the advantages of systems implemented in accordance with features of the present disclosure over existing systems in the transaction monitoring space is the integration of various data elements that collectively contribute to the overall score, rather than the application of rules and thresholds. This novel approach provides a clear benefit in that entities who may be engaged in suspicious activity, who would otherwise be unidentified by existing automated monitoring systems which merely apply a rule and threshold approach, can now be identified.

Another advantage of systems implemented according to aspects of the present disclosure is the automation of the end-to-end process including the ability to configure a Model with selected Factors and the ability to add new Factors to the Model, which are then applied to the input data in its standardized format, without further manual intervention. This allows a system implemented according to aspects of the present disclosure to refine, update, or otherwise enhance its transaction monitoring functionality and to propagate the updates to the input data automatically.

Thus, it should be appreciated that the techniques and systems disclosed herein provide a better transaction monitoring system. The methods and systems described herein are more than merely applying a process into a computer to improve the process. Rather, the methods and systems described herein embody a distinct process and a particular implementation that provides an improvement to existing computer systems by providing the computer systems with new capabilities and functionality, which prior art computer systems do not possess.

Figure 1:
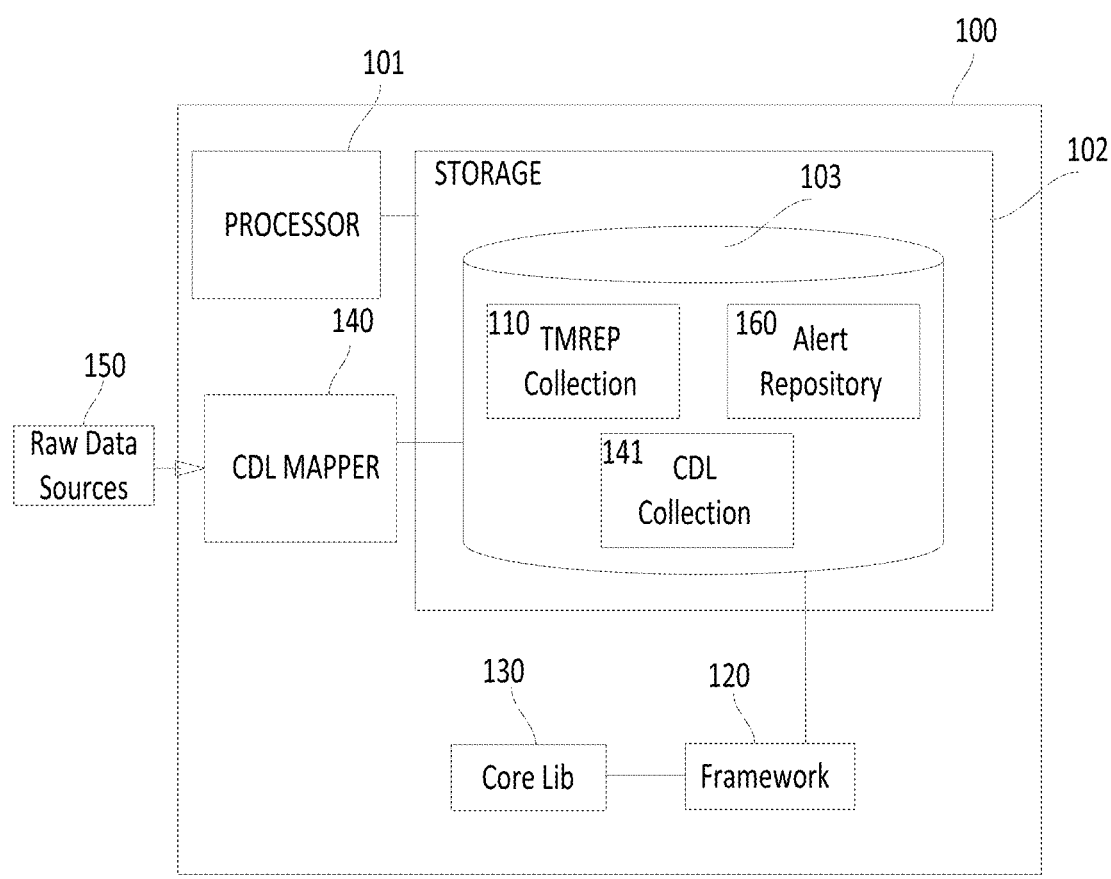
FIG. 1 is a block diagram that represents a system configured to perform operations in accordance with embodiments of the present disclosure.

FIG. 1 is a block diagram of an exemplary system 100 configured with capabilities and functionality for integrating disparate data feeds and for providing unified data monitoring to identify entities and/or transactions associated with the data for further investigation in accordance with embodiments of the present application. As shown in FIG. 1, system 100 of the illustrated embodiment includes processor 101, storage 102, file system 103, common data layer (CDL) mapper 140, Core Library 130, and Framework 120. The various components of system 100 may cooperatively operate to provide functionality in accordance with the discussion herein. For example, in operation according to embodiments, raw data sources 150 may be provided as input to system 100. Raw data sources 150 may comprise transaction data from disparate sources, having different formats, and associated with various entities. The various components of system 100 may cooperatively operate to integrate the transaction data from the disparate raw data sources 150, and to apply Factors from a Model to the data in order to determine a risk score for various entities, where the risk score may be configured to identify entities that may warrant further investigation to determine whether the entities may be conducting suspicious activity. In determining the risk score for each entity, system 100 may allow identification of entities with risk scores above a predetermined threshold, which may be referred for case management. In aspects, system 100 may be configurable to run on specific entities in the data, and on a specific schedule.

It is noted that various components of system 100 are illustrated as single and separate components in FIG. 1. However, it will be appreciated that each of the various components of system 100 may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

It is also noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

Processor 101 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 101 may comprise code segments (e.g., software, firmware, and/or hardware logic) executable in hardware, such as a processor, to perform the tasks and functions described herein. In yet other aspects, processor 101 may be implemented as a combination of hardware and software. Processor 101 may be communicatively coupled to storage 102.

Storage 102 may comprise one more memory devices, including one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or any combination thereof. Storage 102 may comprise a processor readable medium configured to store one or more instruction sets (e.g., software, firmware, etc.) which, when executed by a processor (e.g., one or more processors of processor 101), perform tasks and functions as described herein. In aspects, storage 102 comprises instructions for executing at least a portion of the functional blocks and components thereof, of system 100 of embodiments.

Storage 102 may also be configured to facilitate storage operations. For example, storage 102 may comprise file system 103 for storing mapped datasets obtained from mapping raw data from raw data sources 150 to the CDL scheme of embodiments, for storing processed datasets that include type mapping and entity-specific metadata, for storing Factors, Models, and generated alerts, etc. In aspects, file system 103 may comprise a database, and may include Type Mapping (TM) Repository (TMREP) Collection 110, CDL collection 141, and Alert Repository 160, which are described in more detail below. File system 103 is illustrated as integrated into storage 102, but may be provided as a separate storage module. Additionally or alternatively, file system 103 may be integrated into a single component, such as a single database, or may be distributed over a plurality of modules, such as a plurality of databases.

In embodiments, raw data sources 150 may provide structured data to CDL mapper 140. Raw data sources 150 may be provided by various data sources from data repositories containing information of interest, including client information, account information and transactional information. In aspects, raw data sources 150 may be provided from different sources. The data from the different sources providing the various data feeds in raw data sources 150 may have different data structures or formats. As will be appreciated, processing these disparate data feeds in order to identify specific patterns and/or behavior, such as suspicious activity, may typically be difficult.

In some embodiments, common data schema may be provided to configure and/or map the raw data from the various raw data sources, which may have different data structures, into common representations and/or common data schema. The common data schema may include data representations that may be common within the operations of system 100, and may be used across the various components and modules of system 100. In some embodiments, CDL mapper 140 may be configured to implement the common data schema. CDL mapper 140 may use various and different rules to map the various features of system 100 into common data structures and logical data models. This may allow the different features, components, and modules of system 100 to process the data obtained from raw data sources 150 in a standardized and common model. The format of the various CDL data models may vary depending on the requirements of the system, and may be configured depending on particular features. For example, in some embodiments, CDL mapper 140 may map customer entities to industry segments using various and different rules applied to the raw data.

Figure 3:
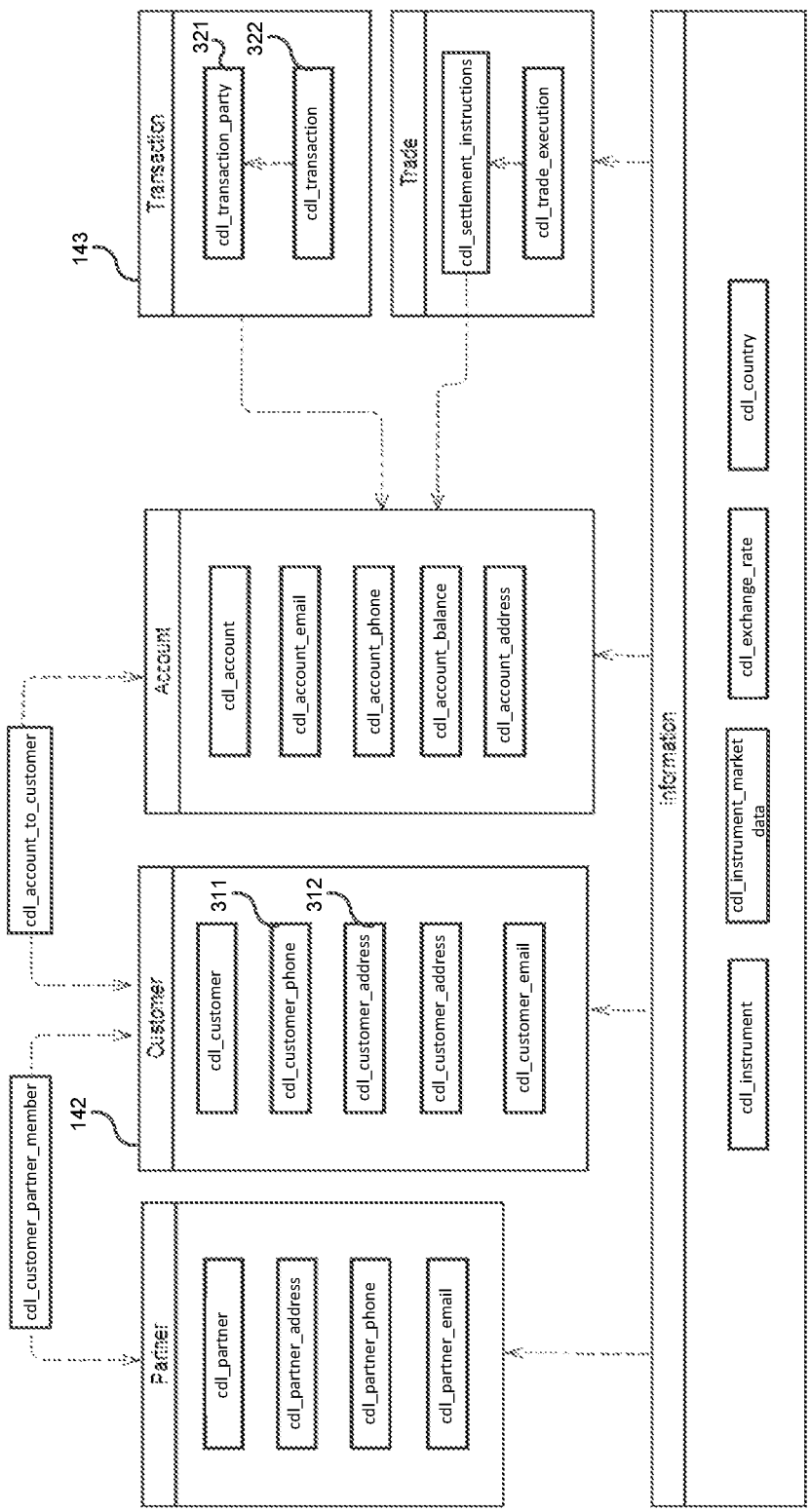
FIG. 3 is a block diagram that illustrates an exemplary common data layer schema in accordance with an embodiment of the present application.
Figure 4:
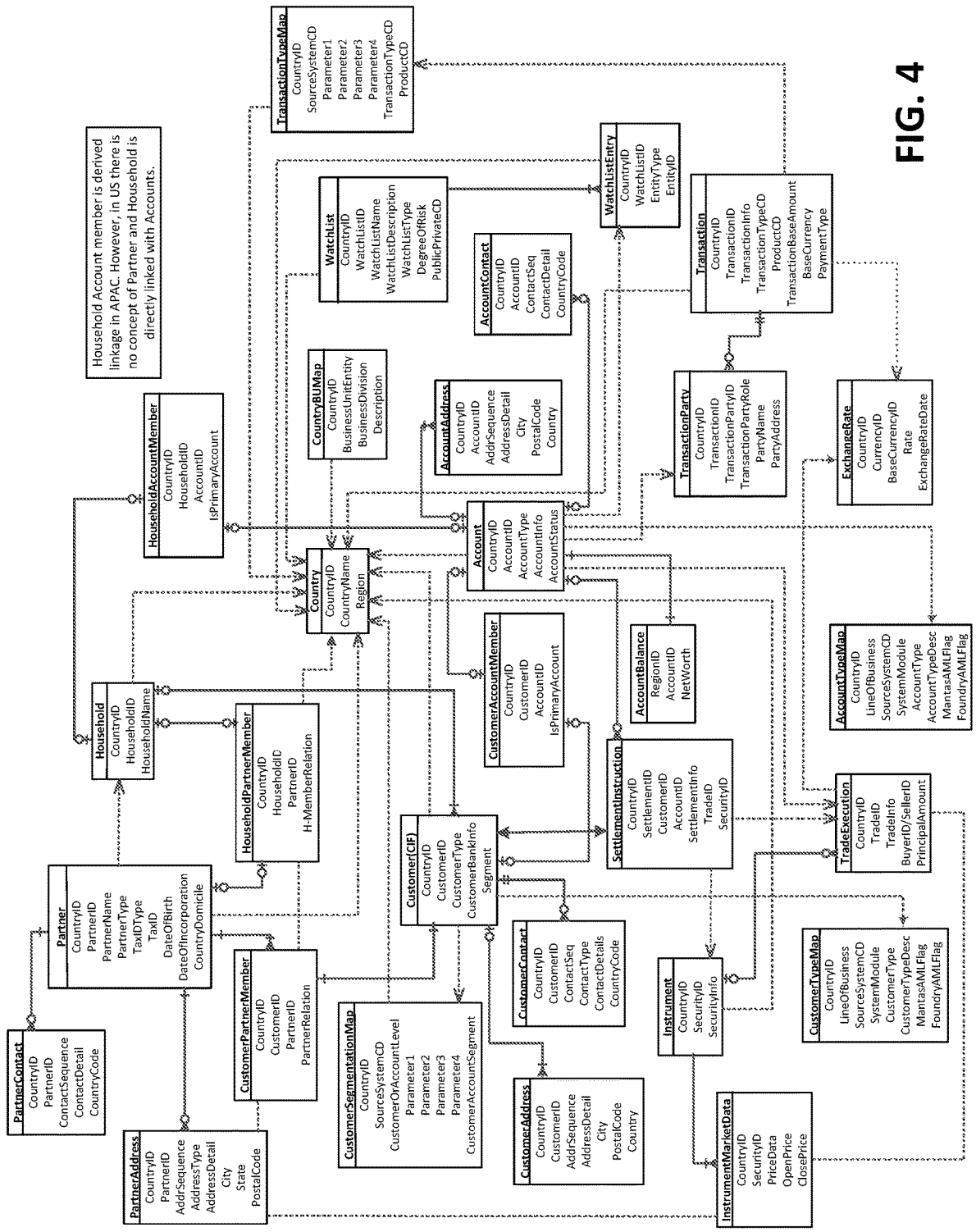
FIG. 4 is a block diagram that illustrates an exemplary common data layer schema in accordance with an embodiment of the present application.

Examples of CDL data models are illustrated in FIGS. 3 and 4. As can be appreciated, CDL data models may include at least one table (e.g., tables 142 and 143) representing an aspect to which the raw data may be mapped. For example, table 142 may be used to map data related to a customer, and table 143 may be used to map data related to a transaction. Each table may correspondingly include at least one attribute associated with the aspect represented by the table. For example, table 142 may include attribute 311 to indicate the customer's phone number and attribute 312 to indicate the customer's address. Similarly, attribute 321 of table 143 may indicate a party to the transaction and attribute 322 may indicate the transaction. In some aspects, the attributes in the table may be configured to be common to various systems from which the raw data feed may be received. Thus, CDL mapper 140 abstracts the features and capabilities of system 100 so that the operations of system 100 may be independent of the raw data feed and/or the system that provides raw data sources 150. Additionally, CDL mapper 140 may be configured to provide a common data structure for the various features, components, and modules in system 100.

Figure 2:
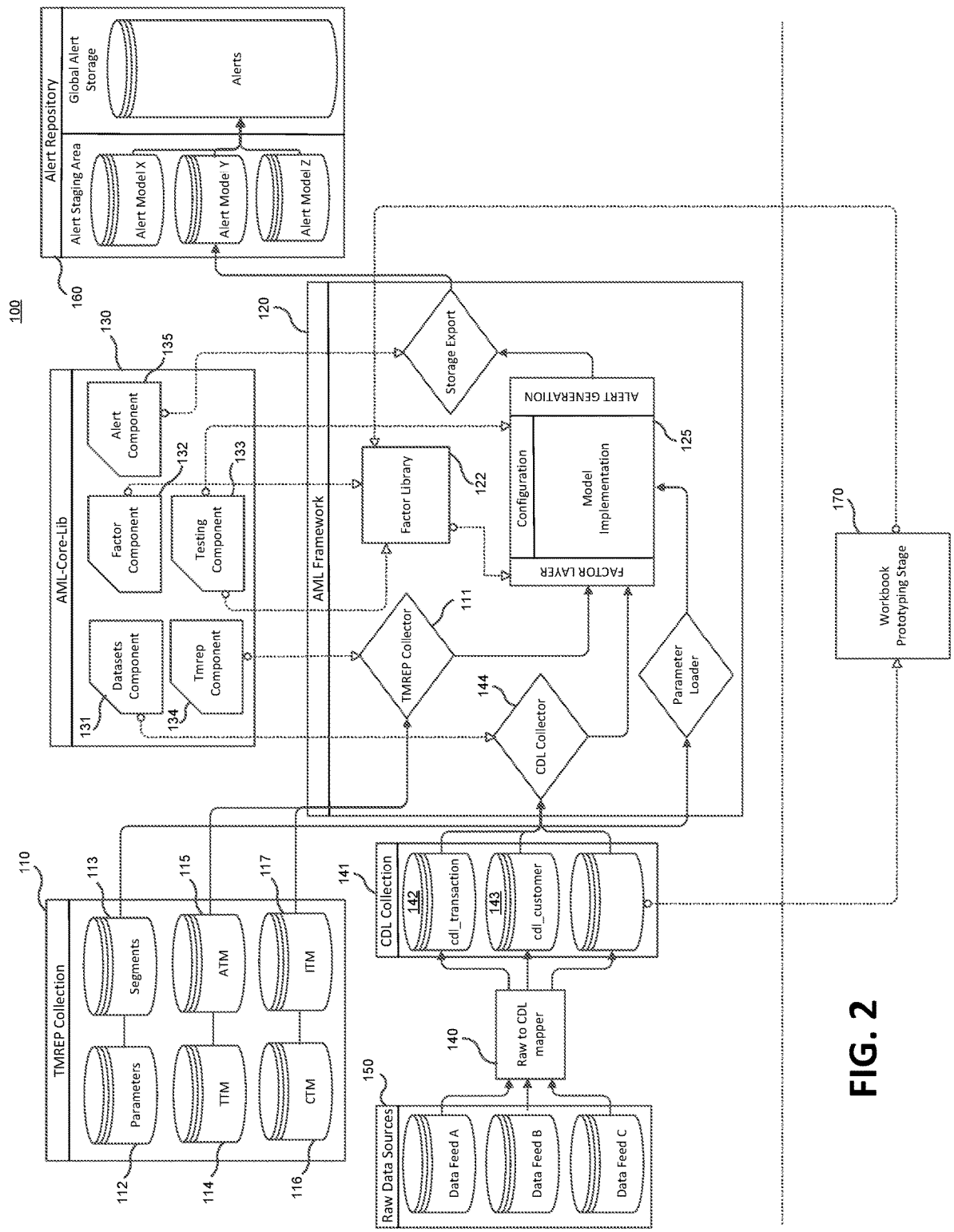
FIG. 2 is a functional block diagram of the system configured to perform operations in accordance with embodiments of the present disclosure.

In embodiments, application of CDL data models by CDL mapper 140 to the raw data may result in datasets. These datasets may be stored in CDL collection 141 shown in FIG. 1. With reference now to FIG. 2, CDL collection 141 may be configured to include at least one storage system configured to store the datasets (e.g., datasets of tables 142 and 143). In some aspects, CDL collection 141 may be communicatively coupled to CDL collector 144. CDL collection 141 and CDL collector 144 may cooperatively operate to ensure that a Model collects the appropriate data using dataset component 131, described in more detail below. In some implementations, the datasets may be subject to data integrity checks and/or monitoring.

In some aspects, CDL collector 144 may be configured to provide query capabilities to Framework 120. For example, when the CDL model changes, or when the CDL data is changed or updated, CDL collector 144 may provide functionality to query the correct version of CDL collection 141. In this case, CDL collector 144 may be configured to provide a way to retrieve the correct location of the appropriate data for the Model. In aspects, CDL collector 144 may be communicatively coupled to the dataset component 131 of Core Library 130, described in more detail below.

TMREP Collection 110 may be configured to store a collection of datasets that may include metadata information about clients, accounts, and/or transactions. In some implementations, TMREP Collection 110 may be used to determine which transactions, accounts, and/or customers are in scope of the transaction monitoring or which transactions are physical transactions, etc. For example, TMREP Collection 110 may be configured to store information that has been learned from subject matter experts with regard to which accounts, which customer clients, which transaction types warrant monitoring. In some cases, TMREP Collection 110 may be used to allow monitoring of various aspects of customer data with different risk considerations. In one particular example, with respect to a Factor such as "industry risk," data from the CDL may indicate the industry in which a certain customer is active. In this case, a Factor may be constructed that determines the industry risk by combining the data from the CDL with information from TMREP Collection 110. For example the casino industry may be high risk, while the banking industry may be low risk. In this case, TMREP Collection 110 may be used to determine what should and should not be monitored, but also what are the weighting of various different pieces of data.

TMREP Collection 110 may include Segments Storage 113 configured to store segment information related to clients. In some aspects, customers or clients may be split into segments. There may be a range of different segments. For example, customers may be segmented into natural person customers, corporation customers, and industry customers. An industry based Factor may be of no relevance to a natural person customer because a natural person is not an industry or a corporation. Therefore, if a Model contains an industry range, the industry-based Factor should be weighted at zero when the Model is run on a natural person customer.

TMREP Collection 110 may include Parameter Storage 112. Parameter Storage 112 may be configured to store Model parameters. Parameter Storage 112 may allow application of the proper values to the Model parameters taking into account the segment of the client.

TMREP Collection 110 may include Transactions Type Mapping (TTM) 114. TTM 114 may be configured to allow in-scoping and out-scoping. For example, TTM 114 may be configured to store (for each transaction type) reference data as to whether the transaction is relevant to current applications, structured information describing the transaction (e.g. is it physical or electronic, is it customer initiated, over what channel does it occur), and associated risk levels that may be used by Factors similar to Customer, Account, and Industry mappings.

TMREP Collection 110 may include Account Type Mapping (ATM) 115. In some embodiments, ATM 115 is similar to TTM 114 but for account types. It may be configured to store information describing which account types should and should not be monitored and risk ratings associated with those account types that can be used by Factors. In some embodiments, the system may handle data related to different types of accounts, such as pension accounts, checking accounts, saving accounts. The rules and criteria for the different accounts may vary.

TMREP Collection 110 may include Customer type mapping (CTM) 116. In some embodiments, CTM 116 is similar to TTM 114 and ATM 115 but for customer types. It may be configured to store information describing which customer types should and should not be monitored and risk ratings associated with those customer types that can be used by Factors. In some embodiments, the system may handle data related to government agencies, corporations, or natural persons. Some types of customers may be higher risk and some may be lower risk. Additionally, some customers may not be subject to monitoring.

TMREP Collection 110 may include Industry Type Mapping (ITM) 117. In some embodiments, ITM 117 is similar to TTM 114, ATM 115, and CTM 116 but for industry types. It may be configured to store information describing risk ratings associated with industries that can be used by Factors in combination with industry identifiers in the CDL.

In embodiments, Core Library 130 may be configured to provide functionality for implementing Factors in accordance with the present disclosure. In aspects, Core Library 130 may include Factor component 132. Factor component 132 may be configured to allow definition of Factors, with interdependencies to derive information out of list of datasets from the CDL and the TMREP components. As noted above, as used herein, a "Factor" may refer to a rule, a function, a set of functions, a set of instructions, or a combination thereof, executed on a data platform.

For instance, a Factor may be a function or a set of functions to derive the total volume of transactions per clients. A Factor may also be defined as a pattern Factor to derive some behavioral features, such as the sum of similar amounts per client. Furthermore, Factors may rely on data from CDL mapper 140 and TMREP Collection 110 and may be independent of the region or the time frame in which the Factor may be applied. In some aspects, Factors may be rerun in any desired configuration. Factors may also be configured as building blocks for creating Models defining features which describe clients, accounts, transactions, etc., and/or may have a dependency on other Factors. Implementation of Factors is discussed in more detail below with respect to FIG. 6.

FIG. 5 is a block diagram that illustrates a configuration of Factor 500. As noted above, Factor 500 may derive information from the integrated data. The configuration of Factor 500 may include a Factor ID 502 that may be used to identify the Factor. As discussed herein, Models may be generated that include various Factors, and Factors may have inter-dependencies. Factor ID 502 may facilitate these functions by providing a way to identify the various Factors. The configuration of Factor 500 may also include a Name 504 and a Definition 506 to provide insight into aspects of Factor 500. The configuration of Factor 500 may also include Factor Description 514, which may be more descriptive than Definition 506. In embodiments, Factors may be associated with different components, such as a client reference component, an aggregated profile component, a history component, etc. Component 508 may be used to indicate the component associated with Factor 500. It is noted that the different components to which Factors are associated may provide means for classifying the Factors into specific groups, which may provide advantageous functionality for a particular model. For example, in some implementations, various Factors may be presented to a user from a master factor table. In this case, classifying the Factors into specific groups may provide a useful user experience, or be used to influence/determine processes followed or whether an alert may be generated based on a component level score, as well as an overall score, in cases where a particular model employs scoring.

The configuration of Factor 500 may also include Risk Mapping 510. In aspects, risk mapping may be performed for Factors based on categorical data, e.g., countries, where a raw value may be mapped to a risk rating. In some cases, the raw values may be determined by subject matter expertise and/or statistical analysis, and may be dependent on use case. In aspects, the raw values that may be mapped to risk ratings may include values in the range of 0 to 1.

The configuration of Factor 500 may also include Factor Filters 512. Factor Filters 512 may be configured to control which entities Factor 500 may apply to. For example, Factor Filters 512 may specify that the Factor 500 may be applied to customer types, account types, organization types, natural person types, non-natural person types, transaction types, and/or any combination thereof. In some embodiments, no filter may be applied.

The configuration of Factor 500 may also include Distribution 516. Distribution 516 may be used to indicate how the results of Factor 500 may be distributed over the entire data collection, or only over the set of relevant entities.

The configuration of Factor 500 may also include Null Behavior 518. Null Behavior 518 may be used to specify a risk value that will be assigned when the datasets required by Factor 500 may not be available or are null. The configuration of Factor 500 may also include Values Indicating Risk Activity 520. Values Indicating Risk Activity 520 may be used to specify how the risk associated with Factor 500 is affected by the values of the data to which the Factor is applied. For example, for a Domicile Risk Factor, the domicile risk may be proportional to the domicile country of the entity.

In some embodiments, implementation of Factors may include providing pre-processors that may be used for pre-use operations with respect to the Factors. Pre-processors may be configured to perform intermediate data transformation that may be used by other Factors, and/or even other pre-processors. As such, pre-processors may provide pre-use operations. In these cases, each preprocessor may represent a common data transformation logic that may be re-used by other preprocessors and/or Factors. For example, an operator may desire to compute a number of transactions and total transactions over last year, and may create a Factor for each operation. In this case, the desired operations may share pre-use functions, and may thus share a same pre-processor. For example, the above operations may share a pre-processor (e.g., transactionsLastYear) that takes as input a raw transaction dataset (e.g., a cdl_transaction dataset) and outputs only transactions with an execution timestamp in last year. In aspects, each preprocessor might consume a number of parameters. For example, transactionsLastYear may be configured with a parameter 'as_of_date'. In aspects, Factors sharing a same pre-processor can be assembled together to be run at the same time to create aggregated datasets that includes all Factors.

Once data has been standardized into a common representation by CDL mapper 140, Factors may be applied to the common data. A Factor may also be described as a building block for Models within the context of the present application. In aspects, Factors may be a configured by an operator. For example, a user may desire to compute a number of transactions and a number of transactions for the year. As noted above, there may be dependencies because the Factors may use the same functions beforehand (e.g., preprocessor), or because the Factors share a dependency with other Factors. Because the Factors may be associated with dependencies, different Factors may be assembled with each other. In some aspects, Factor Library 122 may be configured to store the Factors so that they may be reused.

With reference to FIG. 2, Core Library 130 may include dataset component 131. In aspects, executing a project using Factors and Models of embodiments may include retrieving the data that may be consumed by the Factors and Models. Dataset component 131 may be configured to retrieve the required datasets which are processed by the Factors and Models. In aspects, an operator need not know the location or the status of the data, instead, the operator may simply indicate which version the operator desires to use and which datasets in order to ensure consistency of the Model.

Core Library 130 may include TMREP component 134. TMREP component 134 may be configured to allow fetching of the required information regarding the data from the CDL, such as the transactions which are in scope from an operation perspective, or determine which type of transaction may be related to the processing. TMREP component 134 may also be configured to allow retrieval of a set of segments and parameters from TMREP Collection 110 in order to generate alerts. In aspects, the segment and parameters may be constants, weights, bias, etc.

Core Library 130 may include Alert component 133. Before using alerts in a case manager, the alerts may be reformatted and stored in a common scheme which may be further processed to export the alert to various and/or different external systems. Alert component 133 may be configured to format alerts and send the alerts to the case manager system that will be handling the alerts. Alert component 133 may be a transformation component that abstracts from the Model implementer certain status on how to prepare and send the alerts that the alerting systems are handling. Alert component 133 may also be configured to store/historize the alerts within the Alert Repository 160.

Core Library 130 may include Testing component 135. System 100 may be configured to allow and encourage use of unit testing on the process to try to minimize the risk of missing data or unexpected behaviors. Testing may be provided at the Factor level, and the Model level. Testing component 135 may be configured to provide the testing capabilities of system 100. It may be important to make sure that the Model is operating as expected. At the Factor level, each component in the Factor development should be tested to ensure it is operating as expected. Testing component 135 provides a framework to make sure Factors may be tested before the Factors are used. At the Model level, it may be desired that the Model is returning the alerts and transactions that should be reviewed. That is, the Model should be doing what the Model is expected to do. Testing component 135 allows creating of dummy cases which are run before the Model is sent to customers via a set of functionalities.

Framework 120 may include Model Repository 125, which may further include a Model Implementation Module, a Configuration Module, a Factor Layer, and an Alert Generation Module. The Factor Layer may be configured to call and apply Factors in order to derive a master factor table for the Model, which the Factor Layer does with reference to Factor Library 122, TMREP Collector 111, and CDL collector 144. Within the framework of system 100, the Model uses and manages the different components of system 100 to satisfy the requirements of the project. Model Repository 125 is versatile, flexible, and configurable to handle different perspectives of suspicious activity surveillance, from look-back analysis to daily monitoring. During operation, Model Repository 125 may perform operations that may include specifying the name and versions of the datasets which may be required in a transaction monitoring project. The operations may also include specifying Factors that may run on the dataset with the expected configuration, generating a Factor table that may be stored on the system for further analysis, ensuring that the relevant Model parameters are applied based on the client segmentation, and generating alerts that may be provided to different case manager systems. Model Repository 125 may also be configured to perform a set of mathematical operations on the Factor outputs to derive a score upon which the decision to alert is made.

In aspects, when a Model is being developed, a user may specify what Factors may be required for a particular Model. A master factor table may contain selected Factors from Factor Library 122. Factor Library 122 may be configured to contain Factors that have been implemented. The Model may also be configured to apply one or more functions to the master factor table to determine whether an alert will be generated. This may be done by the use of scoring. For example, the Model may compute a risk score, based on the application of the relevant Factors to the integrated data, and may identify entities with a risk score above a configurable threshold. Alerts may be generated to notify case managers of the identified entities for case level review using the existing case management system.

Framework 120 may include TMREP Collector 111, which may be configured to retrieve relevant data with respect to the requirements of a current Model being developed and using the TMREP component 134. For example, when an operator desires to create a specific Model to determine whether a number of transactions is above certain threshold, and specifies certain parameters for this specific Model. In this case, the TMREP Collector 111 may be configured to determine the specific data to be considered, according to Parameter Storage 112, TTM 114, ATM 115, CTM 116, and retrieves them from the CDL. The operator need only specify who the operator is and TMREP Collector 111 may be configured to fetch the correct elements from the appropriate tables.

Alert Repository 160 may be configured to store alerts generated by Framework 120. In some aspects, the alerts may be transferred to various and different case managers for analysis. In some embodiments, the various and different case managers may submit the result of their analyses as raw data included in raw data source 150, thereby allowing the evaluation of previous alerts to be considered by Factors and the Model. In this way, the Model may be self-learning.

Workbook Prototyping Stage 170 may be configured to provide an interactive environment for creating Model and Factor prototypes. When a Model is being developed, a determination of what Factors may be included is made. However, the necessary Factor may not be in the Factor Library 122, which may indicate that the user may have to create it. In order to create the Factor, the operator may need to find out how the Factor is to be built, and what requirements may be needed. For instance, if the Factor is related to a number of selections, which table may be needed to be used may have to be determined. Workbook Prototyping Stage 170 provides an interactive environment, with interactive tools, to allow the user to create the Factor in an interactive way, modify and test different parameters and requirements. Once the user is happy with the results, the user may embed the results in Factor Library 122 so that other people may use the Factor afterwards.

Figure 6:
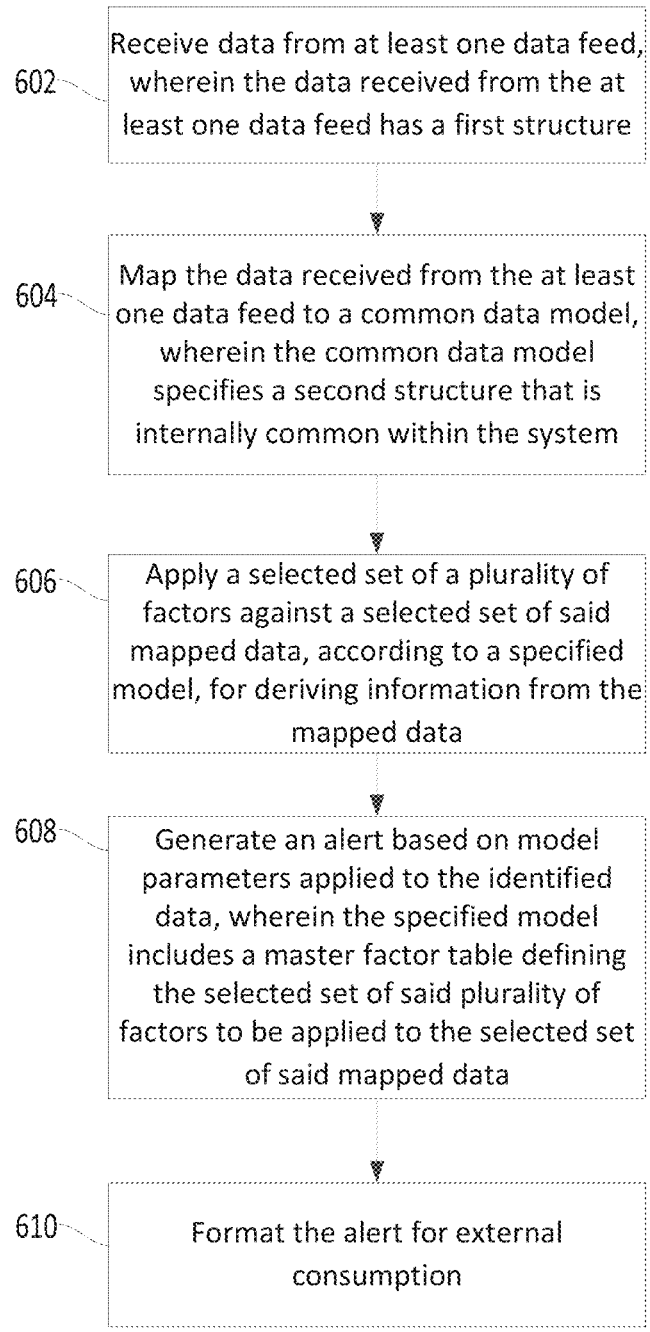
FIG. 6 is a flowchart that illustrates an example process executed to implement aspects of the present disclosure.

Operations of system 100 to provide functionality in accordance with the present disclosure will now be discussed with respect to FIG. 6. FIG. 6 is a flowchart that illustrates an example process executed to implement aspects of the present disclosure. At block 602, data from at least one data feed is received. The data received from the at least one data feed may have a first structure. As discussed above, the first structure of the data may depend on the source from which the data is obtained. In embodiments, additional data may be received from the at least one data feed, and the additional data may have a third structure. The third structure may be different than the first structure of the data. For example, the additional data may be obtained from a different source than the source from which the data having the first structure was obtained. The disparate sources may have disparate structures. In aspects, the data and the additional data may be received by CDL mapper 140 of system 100.

At block 604, the data received from the at least one data feed is mapped to a common data model. The common data model may specify a second structure that is internally common within the system (e.g., system 100 of embodiments). In some embodiments, the additional data having the third structure may also be mapped to the common data model. In this case, the mapping yields mapped data having a common structure, despite the input data, which may include the data and the additional data, having different structures. In aspects, the mapping of the data and the additional data to the common data model may be performed by CDL mapper 140 of system 100. The mapping may be performed by fitting the source data to the relevant and corresponding field in the common data model.

At block 606, a selected set of a plurality of Factors is applied against a selected set of the mapped data, according to a specified Model, for deriving information from the mapped data. In aspects, the specified Model may define the Factors to be included in the selected set of Factors to be applied against the selected set of the mapped data. The Factors to be included in the selected set of Factors may be defined using a master Factor table, which specifies the Factors to be included. In embodiments, Core Library 130 provides the execution environment for the Factors in the plurality of Factors. In some aspects, the specified Model may also define the name and version of the selected set of the mapped data. Framework 120 may provide the execution environment for the specified Model.

The information derived from the mapped data by the Factors may be associated with a particular entity. In this case, the information derived by the Factors may include risk data associated with the entity, deviance of the entity's transactional activity with respect to peer entities, the entity's transaction history, results of previous investigations into the entity, and/or outcome of pattern analysis of the entity's behavior. In aspects, this information may be identified as data to be further evaluated by a case manager.

In embodiments, applying the selected set of Factors according to the specified Model may include calculating a risk score based on the results from each Factor in the selected set. Each Factor in the selected set may be given a weight based on the level of relevance of the Factor. The level of relevance may be based on a characteristic of the associated entity, such as the type of entity (e.g., individual, organization, etc.), the relevant industry segment (e.g., retail, corporations, non-profits, etc.), etc. In embodiments, the risk score for an entity may be based on a weighted combination of the results from the Factors, or may be based on a score of at least one specified category of Factors.

At block 608, an alert is generated based on Model parameters applied to the identified data. In some embodiments, the Model parameters may include a predetermined threshold. In these cases, when the risk score calculated for an entity exceeds the predetermined threshold, an alert is generated for that entity. In some aspects, generating the alert may also include generating alerts on specific transactions or small groups thereof. It will be appreciated that, in these cases, the combined approach may provide an overall automated surveillance framework, with the bulk of the investigative effort provided from the scoring Model approach, but providing a transaction-based approach for extreme cases that must always be investigated, regardless of the score. In aspects, Framework 120 may provide the execution environment for the generation of the alerts.

At block 610, the alert may be formatted for external consumption. In embodiments, the alerts may be reformatted and sent to an external case manager system for further evaluation. In aspects, the Alert Generation module of Framework 120 may provide the execution environment for reformatting the alerts and for sending of the alerts to an external case manager.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1, 2, and 6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a cloud storage facility, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A system for integrating disparate data feeds for transaction monitoring, the system comprising:
　at least one data feed, wherein data in the at least one data feed has a first structure;
　a common data layer configured to map the data in the at least one data feed to a common data model, wherein the common data model specifies a second structure that is common to components of the system;
　a factor component configured to define a plurality of factors and their inter-dependencies for deriving information from the mapped data;
　a model repository, coupled to the factor component and the common data layer, configured to apply a selected set of said plurality of factors against a selected set of said mapped data, according to a specified model, wherein each factor of the selected set of said plurality of factors defines at least one function configured to derive at least a portion of information from the mapped data in a particular category, the applying the selected set of said plurality of factors to:
　identify data in the mapped data to evaluate;
　generate an alert based on model parameters applied to the identified data, wherein applying the selected set of said plurality of factors provides a risk mapping indicating a risk level for each factor with respect to the identified data, and wherein applying the model parameters to the identified data to generate the alert includes applying a function to determine a risk score based on the risk level for each factor, wherein applying the selected set of said plurality of factors according to the specified model includes calculating the risk level based on results from each factor in the selected set of said plurality of factors; and an alert component configured to format the alert for external consumption.

2. The system of claim 1, wherein additional data in the at least one data feed has a third structure, the third structure being different than the first structure of the data, and wherein the common data layer is further configured to map the additional data in the at least one data feed to the common data model.

3. The system of claim 2, wherein the selected set of said mapped data includes the mapped data corresponding to the data having the first structure and the mapped data corresponding to the additional data having the third structure.

4. The system of claim 1, wherein the information derived from the mapped data by the plurality of factors is associated with an entity, and includes at least one of: risk data associated with the entity, deviance of transactional activity of the entity with respect to peer entities, transaction history of the entity, results of previous investigations into the entity, and outcome of pattern analysis of the behavior of the entity.

5. The system of claim 1, wherein the inter-dependencies of the plurality of factors include dependencies between at least two factors of the plurality of factors to each other.

6. The system of claim 1, wherein the inter-dependencies of the plurality of factors include dependencies between at least two factors of the plurality of factors to a common pre-processor.

7. The system of claim 1, wherein factors in the selected set of said plurality of factors are selected based on a level of relevance of the factors to the specified model, the level of relevance determined based on at least one of: a subject matter expert input and statistical analysis of the factors.

8. The system of claim 7, wherein the factors in the selected set of said plurality of factors are weighted against each other based on the level of relevance of corresponding factors.

9. The system of claim 1, wherein the factors in the selected set of said plurality of factors are weighted against each other based on a level of relevance of corresponding factors to the specified model, and wherein the risk level is based on the weights of the factors.

10. The system of claim 1, wherein the alert is generated when the risk level exceeds a predetermined threshold.

11. The system of claim 1, wherein the specified model includes a master factor table defining the selected set of said plurality of factors.

12. A method of integrating disparate data feeds for monitoring transactions in a system, the method comprising:
receiving data from at least one data feed, wherein the data received from the at least one data feed has a first structure;
mapping the data received from the at least one data feed to a common data model, wherein the common data model specifies a second structure that is internally common within the system;
applying a selected set of a plurality of factors against a selected set of said mapped data, according to a specified model, for deriving information from the mapped data, wherein each factor of the selected set of said plurality of factors defines at least one function configured to derive at least a portion of the information from the mapped data in a particular category, the applying the selected set of plurality of factors including:
identifying data in the mapped data to evaluate;
generating an alert based on model parameters applied to the identified data, wherein the specified model includes a master factor table defining the selected set of said plurality of factors to be applied to the selected set of said mapped data, wherein applying the selected set of said plurality of factors provides a risk mapping indicating a risk level for each factor with respect to the identified data, and wherein applying the model parameters to the identified data to generate the alert includes applying a function to determine a risk score based on the risk level for each factor, wherein applying the selected set of said plurality of factors according to the specified model includes calculating the risk level based on results from each factor in the selected set of said plurality of factors; and
formatting the alert for external consumption.

13. The method of claim 12, further comprising:
receiving additional data from the at least one data feed, the additional data having a third structure, the third structure being different than the first structure of the data; and
mapping the additional data received from the at least one data feed to the common data model.

14. The method of claim 13, wherein the selected set of said mapped data includes the mapped data corresponding to the data having the first structure and the mapped data corresponding to the additional data having the third structure.

15. The method of claim 12, wherein the information derived from the mapped data by the plurality of factors is associated with an entity, and includes at least one of: risk data associated with the entity, deviance of transactional activity of the entity with respect to peer entities, transaction history of the entity, results of previous investigations into the entity, and outcome of pattern analysis of behavior of the entity.

16. The method of claim 12, wherein the factors in the selected set of said plurality of factors are weighted against each other based on a level of relevance of corresponding factors to the specified model, and wherein the risk level is based on the weights of the factors.

17. The method of claim 12, wherein the generating the alert includes generating the alert when the risk level exceeds a predetermined threshold.

18. An apparatus configured to integrate disparate data feeds for monitoring transactions in a system, the apparatus comprising:
means for receiving data from at least one data feed, wherein the data received from the at least one data feed has a first structure;
means for mapping the data received from the at least one data feed to a common data model, wherein the common data model specifies a second structure that is internally common within the system;
means for applying a selected set of a plurality of factors against a selected set of said mapped data, according to a specified model, wherein each factor of the selected set of said plurality of factors defines at least one function configured to derive at least a portion of information from the mapped data in a particular category, the means for applying the selected set of plurality of factors including:

means for identifying data in the mapped data to evaluate;

means for generating an alert based on model parameters applied to the identified data, wherein the specified model includes a master factor table defining the selected set of said plurality of factors to be applied to the selected set of said mapped data, wherein the means for applying the selected set of said plurality of factors provide a risk mapping indicating a risk level for each factor with respect to the identified data, and wherein applying the model parameters to the identified data to generate the alert includes applying a function to determine a risk score based on the risk level for each factor, wherein the means for applying the selected set of said plurality of factors according to the specified model include means for calculating the risk level based on results from each factor in the selected set of said plurality of factors; and means for formatting the alert for external consumption.

* * * * *